United States Patent
Kuncz, Jr.

[11] 3,901,458
[45] Aug. 26, 1975

[54] ROPE CADDY

[76] Inventor: Frank Kuncz, Jr., 2453 Roberts St., Largo, Fla. 33540

[22] Filed: Dec. 6, 1973

[21] Appl. No.: 422,564

Related U.S. Application Data

[63] Continuation-in-part of Ser. No. 246,195, April 21, 1972, abandoned.

[52] U.S. Cl.................................. 242/85.1; 242/96
[51] Int. Cl............................................... B65h 75/36
[58] Field of Search ... 242/85.1, 96, 50, 61, 86.5 A; 24/129 B, 130; 191/12 R

[56] References Cited
UNITED STATES PATENTS

| | | | |
|---|---|---|---|
| 1,151,580 | 8/1915 | Goetz | 242/61 |
| 1,655,065 | 1/1928 | Le Baron | 242/85.1 |
| 3,290,453 | 12/1966 | Jensen | 242/85.1 X |

FOREIGN PATENTS OR APPLICATIONS

| 1,446,932 | 6/1966 | France | 242/96 |

Primary Examiner—John W. Huckert
Assistant Examiner—John M. Jillions
Attorney, Agent, or Firm—Stein & Orman

[57] ABSTRACT

A line storing device of the type having tow lines, fishing line, etc. mounted thereon wherein said device is specifically designed to allow the line to be easily paid out, unraveled or removed therefrom. The device comprises a base having a portion specifically configured to have the line being stored, wound thereon. Line retention means in the form of pivotally or rotatably mounted lobes are positioned adjacent the line storage portion of the base and may be moved into and out of the line retaining position whereby the lobes are oriented to restrict the removal of the line. A handle means in the form of an aperture integrally formed in the base and dimensioned to allow the user of the device to extend his hand at least partially therethrough. A bracket means having a substantially semi-tubular configuration including flexible side wall portions which may have separated portions formed thereon and which removably engage a line gripping element or the like attached to the end of the line being stored. For removal of the line, such as when a ski tow is unwound therefrom, the lobes are rotated into a non-line retaining position, out of the path of the line being removed.

14 Claims, 12 Drawing Figures

PATENTED AUG 26 1975 3,901,458
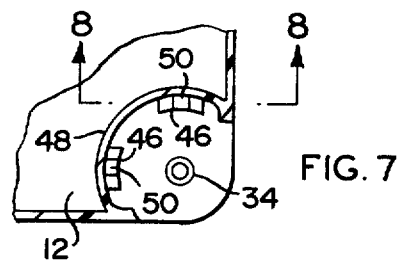
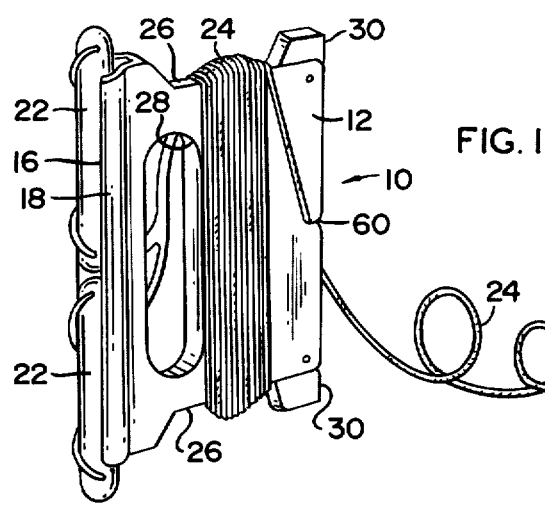
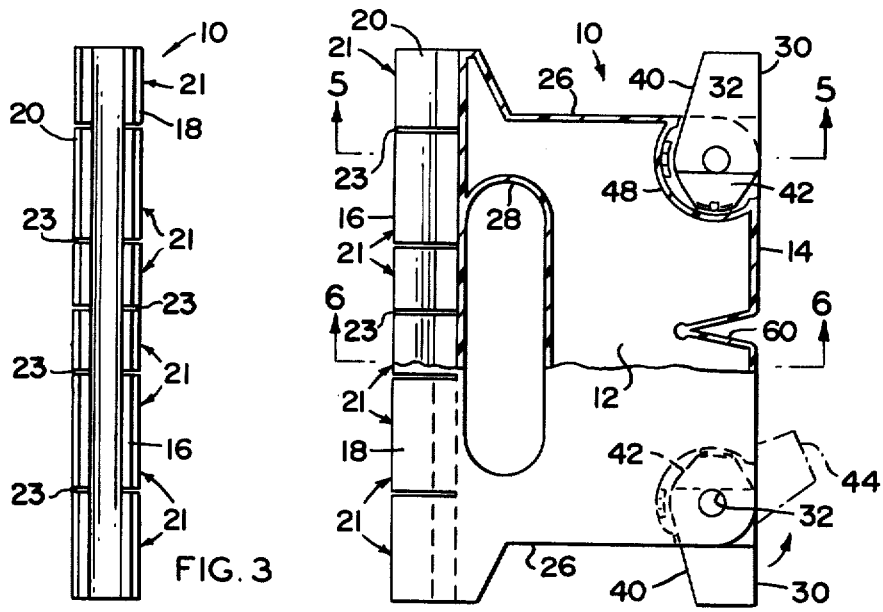
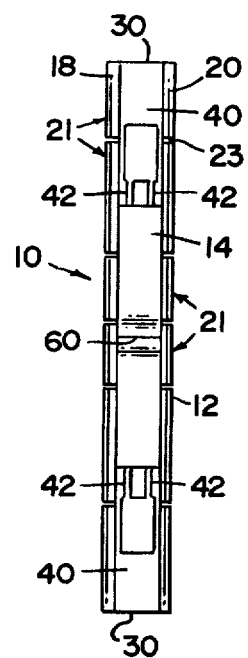
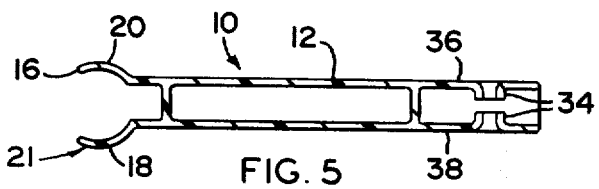
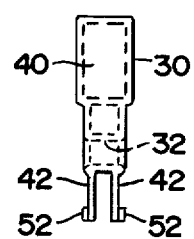
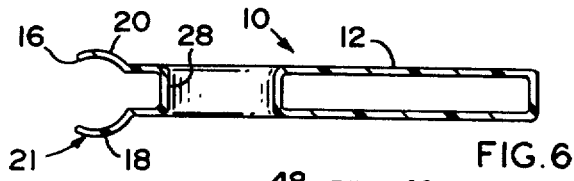
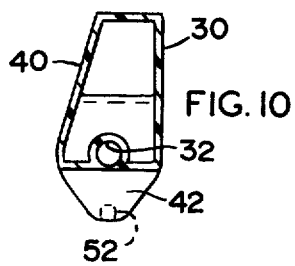
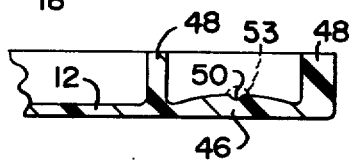
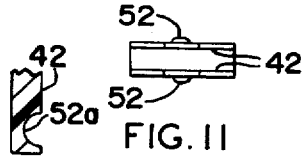

ROPE CADDY

This is a continuation-in-part application of my presently co-pending application SN 246,195, filed Apr. 21, 1972, now abandoned.

BACKGROUND OF THE INVENTION

1. Field of the Invention

This invention relates to a device for storing line, cord, rope or the like thereon in such a manner that the line may be easily removed therefrom, wherein the device includes line retention means serving to restrict or regulate the removal of the line from the device.

DESCRIPTION OF THE PRIOR ART

There are a number of prior art devices which are presently commercially available and which are intended to have a line or the like of various types wound or otherwise stored thereon in such a manner that the line may be easily unravelled or removed from the device. These types of devices are commonly used for the storage of fishing lines, tow lines for water skiing or in any other activity where lines of this nature are used to the extent that these lines are periodically stored and removed from a storage position.

Prior art examples of such structures are found disclosed in the following U.S. Patents.

The U.S. Pat. to Schmucker, No. 1,016,783 discloses a fishing line holder comprising a one piece base specifically configured to have a portion about which a line or the like is wound in stored position. A handle gripping means is movably mounted at the rear of the device and is dimensioned to be held between the fingers of a hand of the user. An aperture is located in the top rear corner of the device and serves to allow the line to be passed therethrough in loop form so that the loop may be enlarged and draped over one corner of the device thereby preventing removal of the line therefrom.

The U.S. Pat. to Falkum, No. 3,174,703 also is directed to a line storing device in the form of a substantially tubular reel element wherein the line being stored is wound about the outer peripheral surface of the reel. A handle by which the user grasps the reel is provided on the interior of the reel in the form of a substantially U-shaped strap attached to opposed ends of the interior surface of the reel.

The U.S. Pat. to French No. 3,174,702 discloses a combined handle and reel for water ski rope where the tow rope is wound about two outwardly extending and oppositely located arms which define, along with the main handle, a pair of opposed outwardly opened grooves or channels about which the tow rope is wound.

Other prior art structures of the type generally referred to above are disclosed in the U.S. Pat. to Swain, Nos. 2,866,436, Walker 3,033,487 and Neumiller 3,216,670.

All of the prior art structures disclosed in the above-cited references have a somewhat common characteristic in that they are each designed for a rather specific purpose. None of these structures are specifically designed and configured to have the versatility which allows the line storage device to be used for a number of various purposes. Devices of this nature while having relatively simple structural features, to enable the device to be manufactured at a low cost should also be constructed so as to eliminate fouling of the line or cord as it is rapidly removed from the device. Along these lines an efficient, reliable, yet inexpensive structure should also be provided on this type of device to prohibit or restrict the removal of the line from the device unintentionally. Other advantages such devices should incorporate, while maintaining simplicity of structure, include the device being unsinkable when used around water and also durable since such a device would normally be subjected to the outdoors and to a salt water environment for prolonged periods of time.

SUMMARY OF THE INVENTION

This invention relates to a line storing device of the type wherein relatively long lengths of line such as used in water skiing, fishing, boating, and other various activities are stored in such a manner that the line may quickly be removed from the device such as when it is put into use.

More particularly, the device comprises a base which is specifically configured to have a line storing portion defined thereon. This line storing portion is shaped such that the line may be wound about the base in a manner which allows the line to be readily removed therefrom. The base further comprises a front or leading peripheral edge and a rear peripheral portion or edge which is arranged in opposed relation to the leading edge. A handle means which may include an aperture integrally formed in the base is positioned adjacent to the trailing peripheral portion and is dimensioned so as to allow the hand of the user to extend at least partially therethrough and at the same time wrap around the rear peripheral portion or edge.

The rear edge of the device is configured in a substantially semi-tubular shape and includes flexible side wall portions extending the length of the rear edge. By virtue of this arrangement a line gripping element such as a tow handle or the like may be snap fitted or otherwise frictionally connected to this tubular bracket means in such a manner that it may be easily removed therefrom. When a tow line, as used in water skiing, is stored on the device, this bracket means may be structured to accommodate either a single or a twin bar ski tow line.

In order to accompany the wide variance in the configuration of the handles of the ski ropes, one embodiment of the present invention includes the side walls of the bracket having segmented portions formed therein.

In order to regulate or restrict the removal of the line from the line storage portion of the base of the device, line retention means are positioned adjacent to and in cooperating relation with this line storage portion. More particularly, the line retention means comprises a pair of rotatably or pivotally mounted lobes arranged in spaced relation to one another on the opposite corner contiguous to the front or leading edge of the base. Because of their pivotal mounting each lobe may be rotated between a line retention and a non-retention position. The line retention position is defined by the lobes having their longitudinal axis arranged substantially perpendicular to the path of travel of the line as it is removed from the device. Alternately, when it is desired to remove the line from the device, the lobes are rotated to a position where each of their longitudinal axis is substantially parallel with the path of travel of the line as it leaves the device.

Lobe locking means are provided in the form of detents cooperatively positioned to engage a portion of the lobe thereby selectively maintaining it in either the line retention or the nonretention positions as desired. As will be explained hereinafter, a detent is provided for each of the positions in which each of the lobes will be maintained. It should be further noted that the lobes may be interconnected to one another by appropriate linkage such that movement of one of the lobes into a desired position automatically causes the opposite lobe to move into the corresponding position due to operation of the interconnecting linkage.

In another embodiment of the present invention, protrusion means and detent means may be cooperatively positioned on the inner-surface of the side wall portions and on the outer surface of the lobes, respectively.

Operation of use of the device will be described hereinafter with reference to the line being stored comprising a ski tow line used for water skiing. However, it is obvious from the above disclosure that a variety of types of line could be utilized in conjunction with this device other than a ski tow line.

In operation, the movable lobes are arranged in the line retaining position and a portion of the line nearest the boat is channeled through a slot integrally formed in the leading or front portion of the device. The line or rope is then wound about the line retaining portion as the user of the device holds it about the handle means. When the line is completely wound the tow line gripping means or handle may be snapped in fixed engagement with the tubularly configured bracket means. Removal of the line from the device is accomplished by removal of the line gripping means from the bracket and arranging of the lobes in the non-retention position. The user of the tow line then may hold onto the line gripping means thereby allowing the line to unravel or be rapidly removed from the line storing portion of the base while the device is being held by one in the boat.

The invention accordingly comprises the features of construction, combination of elements and arrangement of parts which will be exemplified in the construction hereinafter set forth and the scope of the invention will be indicated in the claims.

BRIEF DESCRIPTION OF THE DRAWINGS

For a fuller understanding of the nature and objects of the invention, reference should be had to the following detailed description taken in connection with the accompanying drawing in which:

FIG. 1 is a perspective view of the line storing device of the present invention.

FIG. 2 is a front sectional view of the device of FIG. 1.

FIG. 3 is an end view of the rear peripheral portion of the device.

FIG. 4 is an end view of the front peripheral portion of the device.

FIG. 5 is a sectional view taken along lines 5—5 of FIG. 2.

FIG. 6 is a sectional view taken along lines 6—6 of FIG. 2.

FIG. 7 is a detailed view of the line retention means of the present invention.

FIG. 8 is a sectional view taken along lines 8—8 of FIG. 7 with protrusion 53 shown in broken lines.

FIG. 9 is a detailed view of the lobe of line retention means.

FIG. 10 is a front view of FIG. 9.

FIG. 11 is an end view of the structure shown in FIG. 10.

FIG. 12 is a sectional view showing an alternate embodiment including detent means 52a formed on legs 42.

Similar reference characters refer to similar parts throughout the several views of the drawings.

DETAILED DESCRIPTION

This invention relates to a line storing device generally indicated as 10 in FIG. 1 and is clearly shown in FIGS. 1 and 2 as comprising a base 12 including a front or leading peripheral edge or portion 14 and a rear peripheral portion 16 arranged in opposed spaced relation to one another. As shown in FIG. 1, the rear edge or portion 16 is defined by a bracket means which includes a substantially semi-tubular configuration partially defined by flexible side walls 18 and 20 extending the length of base 12. Due to the flexibility of these side walls a line gripping means 22 which may be in the form of a handle on the end of a ski tow line 24 is snap fitted into or otherwise frictionally engaged by the bracket means. This allows the line gripping means to be easily removed from the base 12 when it is desired that the line be placed in use. Also as shown in FIG. 1, the line gripping means 10 comprises a double tow handle as well as a single tow handle.

Alternately, the bracket means as shown in FIGS. 2 and 3 comprise a substantially segmented semi-tubular configuration at least partially defined by side walls 18 and 20 having a plurality of segments 21 formed in these side walls. As explained above, these segments allow independent movement of the segmented portions of side walls 18 and 20. This in turn allows handles 22 attached to the ski rope 24 to have substantially varied configurations and still be retained within the bracket 20. These segment portions are defined by slot means 23 in side wall 18 and 20.

The base 12 is specifically configured to define a line storage portion 26 about which line 24 may be wound. As clearly shown, the line storage portion takes up the center part of the base since the line 24 is wound completely around the base.

A handle means in the form of aperture 28 is integrally formed in the base adjacent to the bracket means or the rear peripheral portion 16. The aperture 28 is dimensioned such that the hand of the use of the device may at least partially extend therethrough while at the same time partially surrounding the portion 16 thereby securely gripping the device when in use. The device of the present invention further comprises line retention means in the form of rotatably or pivotally mounted lobes 30. Each lobe comprises an aperture 32 designed to be mounted on hub extensions 34 (FIG. 5) whereby the apertures 32 and the hub extension 34 are dimensioned to allow rotation of each lobe 30. The spacing between portion 36 and 38 of base 12 is such that the distance between extension 34 is sufficient to maintain the lobes 30 securely on the base while allowing each lobe to be movable relative thereto. Each lobe is configured such that portion 40 extends outwardly on the exterior of base 12 while the lower or inner portion 42 is movably positioned on the interior of base 12.

Referring to FIG. 2, each lobe 30 is positioned in both a line retention position, (solid lines) or a line non-retention position shown as 44 in dotted line in FIG. 2. Referring also to FIGS. 7–11, as well as FIG. 2, a lobe locking means is provided in the form of detents 46 arranged in spaced relation about hub extension 34 on the interior of base 12. These detents 46 are mounted contiguous to a semi-angular flange 48 integrally formed to the base, also on the interior thereof. Referring specifically to FIG. 8, each detent 46 may include a centrally located recessed area 50 which is arranged in elevated or raised position relative to the surface 51 of base 12.

In order to maintain the lobes 30 in the desired line retention or non-retention position, as referred to above, the lobe locking means or detents 46 are positioned in the path of at least a portion of each lobe 30. More specifically each of the detents 46 are positioned to engage protrusion 52 integrally formed on the bottom extremity of lobe 30. Of course, this extension and the detents themselves could be arranged in any corresponding relation to one another so that a frictional engagement between protrusion 52 and detents 46 would occur upon rotation of the lobes into the various desired positions. In the particular embodiment shown, recess portion 50 is configured and dimensioned to cooperatively engage protrusion 52 which can be considered a cooperative locking element.

One embodiment of the present invention further comprises detent means 52a positioned on the outer surface of lobes 30 in proper location to abut or lockingly engage protrusions 53 located on the inner surface of wall portion 36 and 38. Protrusion 53 is shown in FIG. 8 in broken lines and represents the alternate embodiment as disclosed above. These portions 36 and 38 are formed with inherent flexibility so as to provide ability to engage the disengage between lobes 30 and portions 36 and 38. In order to facilitate design, the portion 42 may be deleted from each lobe 30, dependent upon the locations of detent means 52a and protrusions 53.

Other structural features of the invention include a substantially centrally located notch 60 formed in the front or leading peripheral portion 14 of the base 12. As shown in FIG. 1, this notch is used to positively engage and hold the line to facilitate the winding when it is being wound for storage.

More particularly, the end 25 of line 24 represents that portion attached to a boat, when a tow line or the like is being used on the device. Of course, any applicable connecting means 27 and float device 29 can be attached to the end 25 of line 24. When it is desirous to wind a line on the device 10 a portion adjacent to the end 25 of the line is fitted through notch 60 and the winding proceeds. The winding of course continues until the line gripping element 22 reaches the base 12 at which time the line gripping element is securely fastened within the bracket means 16. When winding and when it is desired to store the line 24 on the device 10 the lobes 30 are maintained in their line retention position. In this position the longitudinal axis of the lobes are arranged substantially perpendicular to the path of travel of the line as it leaves the device. When it is desired to remove the line 24 from the device the lobes 30 are rotated down into the non-retension position so as to provide an uninterrupted path for the line to follow as it is removed from the base 12 of the device 10.

It will thus be seen that the objects set forth above, among those made apparent from the preceding description, are efficiently attained, and since certain changes may be made in the above article without departing from the scope of the invention it is intended that all matter contained in the above description and shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

Now that the invention has been described, What is claimed is:

1. A line storing device comprising: a base having a predetermined configuration defining a line storage portion thereon, handle means connected to said base, line retention means mounted on said base so as to be movable between a line retaining and a nonretaining position and positioned on said base adjacent to and in cooperative relation with said line storage portion, said line retention means comprising at least one lobe pivotally mounted on said base so as to be movable into and out of said line retaining position, whereby removal of line from said device is restrained when said line retention means is in said line retaining position; bracket means connected to said base and being configured to hold a line gripping element on said base.

2. A device as in claim 1 comprising lobe locking means mounted on said base in the path of said one movable lobe whereby engagement of said one lobe with said lobe locking means maintains said one lobe in a desired position.

3. A device as in claim 2 further comprising at least one cooperative locking element formed on said one lobe and positioned to engage said lobe locking means, both said one cooperative locking element and said lobe locking means being correspondingly dimensioned to frictionally engage one another and thereby maintain said one lobe in a desired portion.

4. A device as in claim 3 wherein said lobe locking means comprises a detent means including a recessed portion configured to frictionally engage said one cooperative locking element.

5. A device as in claim 1 comprising lobe locking means mounted on said one lobe, at least one cooperative locking element formed on said base, both said lobe locking means and said one cooperative locking element disposed in removable, frictional engagement with one another, whereby said lobe may be removably secured in either said line retaining position or said line nonretaining position, said line retaining position and said line nonretaining position defined by the relative positions of said lobe locking means and said one cooperative locking element.

6. A device as in claim 5 wherein said one cooperative locking element comprises a protrusion formed on said base and positioned to engage said lobe locking means, both said protrusion and said locking means being correspondingly dimensioned to frictionally engage one another and thereby maintain said one lobe in a desired position.

7. A device as in claim 1 wherein said bracket means is integrally formed on said base and includes flexible side wall means, said side wall means arranged in an elongated, substantially semitubular configuration, whereby said bracket means removably engages the line gripping element.

8. A device as in claim 7 wherein said bracket means comprises a plurality of segment portions formed in said side wall means, slot means formed in said side wall means and disposed to at least partially define said segment portions, whereby said segment portions are disposed to move independently of one another.

9. A device as in claim 8 wherein said slot means comprises a plurality of slots arranged in spaced relation to one another and to said segment portions, said segment portions being disposed in spaced apart relation to one another.

10. A device as in claim 1 wherein said line retention means comprises a plurality of lobes pivotally mounted on said base in spaced relation to one another, each of said lobes being oriented in obstructing relation to a path of travel of line being removed from said device and thereby defining said line retaining position.

11. A device as in claim 10 wherein each of said lobes is rotatable from said line retaining position into said non-retaining position, said non-retaining position being defined by at least one of said lobes arranged substantially parallel to the path of said line leaving said device.

12. A device as in claim 3 wherein said lobe locking means comprises detent means cooperatively configured and positioned to engage said one lobe upon rotation of said one lobe to a desired position.

13. A device as in claim 12 wherein said lobe locking means comprises a plurality of detents, each of said plurality of detents elevated from the surface of said base on which it is mounted, and located at corresponding position to frictionally engage said one lobe in either line retaining position or nonretaining position.

14. A device as in claim 1 wherein said handle means comprises an aperture formed in said base and configured to allow the hand of the user of the device to extend therethrough.

* * * * *